(12) United States Patent
Yamasaki et al.

(10) Patent No.: US 10,714,761 B2
(45) Date of Patent: Jul. 14, 2020

(54) CATALYST LAYER FOR FUEL CELL, AND FUEL CELL

(71) Applicant: Panasonic Intellectual Property Management Co., Ltd., Osaka (JP)

(72) Inventors: Kazuya Yamasaki, Osaka (JP); Hitoshi Ishimoto, Hyogo (JP); Masashi Shoji, Kyoto (JP); Keiichi Kondou, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 143 days.

(21) Appl. No.: 15/695,036

(22) Filed: Sep. 5, 2017

(65) Prior Publication Data

US 2017/0365862 A1 Dec. 21, 2017

Related U.S. Application Data

(63) Continuation of application No. PCT/JP2016/001331, filed on Mar. 10, 2016.

(30) Foreign Application Priority Data

Mar. 27, 2015 (JP) ................................ 2015-065864

(51) Int. Cl.
*H01M 4/90* (2006.01)
*H01M 4/86* (2006.01)
(Continued)

(52) U.S. Cl.
CPC ........... *H01M 4/9083* (2013.01); *B01J 23/42* (2013.01); *H01M 4/8657* (2013.01);
(Continued)

(58) Field of Classification Search
CPC .................................................. H01M 4/9083
See application file for complete search history.

(56) References Cited

U.S. PATENT DOCUMENTS

| 8,765,324 | B2* | 7/2014 | Hasegawa | ........... | H01M 4/8896 |
| | | | | | 429/482 |
| 2002/0144394 | A1* | 10/2002 | Uchida | ............... | H01M 4/8828 |
| | | | | | 29/623.5 |

(Continued)

FOREIGN PATENT DOCUMENTS

| JP | 2005-190872 | 7/2005 |
| JP | 2008-052933 | 3/2008 |

(Continued)

OTHER PUBLICATIONS

Premetek (Year: 2014).*

(Continued)

*Primary Examiner* — Brian R Ohara
(74) *Attorney, Agent, or Firm* — McDermott Will & Emery LLP

(57) ABSTRACT

A fuel cell catalyst layer includes a plurality of carbon particles, a plurality of catalyst particles, and at least one plate-shaped carbon member disposed between the plurality of carbon particles. The plurality of catalyst particles are supported on surfaces of the plurality of carbon particles. The plate-shaped carbon member may be replaced with a rod-shaped carbon member.

4 Claims, 7 Drawing Sheets

(51) Int. Cl.
*H01M 4/88* (2006.01)
*H01M 4/92* (2006.01)
*H01M 8/02* (2016.01)
*H01M 8/10* (2016.01)
*H01M 8/1004* (2016.01)
*B01J 23/42* (2006.01)

(52) U.S. Cl.
CPC ......... *H01M 4/8892* (2013.01); *H01M 4/926* (2013.01); *H01M 8/02* (2013.01); *H01M 8/10* (2013.01); *H01M 8/1004* (2013.01)

(56) References Cited

U.S. PATENT DOCUMENTS

| | | | | |
|---|---|---|---|---|
| 2003/0091891 | A1* | 5/2003 | Yoshida | H01M 4/8605 429/483 |
| 2004/0038116 | A1* | 2/2004 | Baurens | H01B 1/24 429/514 |
| 2004/0131919 | A1* | 7/2004 | Yasumoto | H01M 4/8828 429/490 |
| 2005/0151121 | A1* | 7/2005 | Buche | C25B 9/10 252/500 |
| 2006/0166074 | A1* | 7/2006 | Pan | H01M 4/8652 429/480 |
| 2006/0204831 | A1* | 9/2006 | Yan | H01M 4/8642 429/483 |
| 2008/0223516 | A1 | 9/2008 | Tanuma | |
| 2011/0315934 | A1* | 12/2011 | Ma | H01B 1/24 252/511 |
| 2015/0349367 | A1 | 12/2015 | Horibe et al. | |

FOREIGN PATENT DOCUMENTS

| | | |
|---|---|---|
| JP | 2009-224181 | 10/2009 |
| JP | 2009-295341 | 12/2009 |
| JP | 2011-124237 | 6/2011 |
| JP | 2013-237602 | 11/2013 |
| WO | 2007/052650 | 5/2007 |
| WO | 2014/091870 | 6/2014 |

OTHER PUBLICATIONS

NPL (Year: 2020).*
International Search Report of PCT application No. PCT/JP2016/001331 dated Jun. 14, 2016.
Sung Chia-Chi et al., "Durability improvement at high current density by graphene networks on PEM fuel cell", International journal of hydrogen energy, 2014, vol. 39, No. 22, pp. 11706-11712.

* cited by examiner

CATALYST LAYER FOR FUEL CELL, AND FUEL CELL

RELATED APPLICATIONS

This application is a continuation of the PCT International Application No. PCT/JP2016/001331 filed on Mar. 10, 2016, which claims the benefit of foreign priority of Japanese patent application No. 2015-065864 filed on Mar. 27, 2015, the contents all of which are incorporated herein by reference.

BACKGROUND

1. Technical Field

The present disclosure relates to a fuel cell catalyst layer and a fuel cell.

2. Description of the Related Art

A fuel cell is a device that generates electric energy from hydrogen and oxygen, and can achieve high power generation efficiency. In recent years, efforts have been made to improve a utilization rate of platinum in catalyst layers for fuel cells. In the conventional art, carbon members are added to a gas diffusion layer so that the diffusibility of air and hydrogen gas is improved. Unexamined Japanese Patent Publication No. 2011-124237 discloses an electrode assembly that includes rod-shaped carbon members added to a gas diffusion layer, for example. The rod-shaped carbon members added to the gas diffusion layer are designed to enhance gas diffusibility and drainage performance. Unexamined Japanese Patent Publication No. 2009-224181 discloses a catalyst layer that includes rod-shaped carbon members supporting platinum. By changing a shape of a carbon member supporting platinum from spherical to rod-shaped, interstices inside the catalyst layer increases and gas diffusibility in the catalyst layer enhances.

SUMMARY

A fuel cell catalyst layer according to a first aspect of the present disclosure includes a plurality of carbon particles, a plurality of catalyst particles, and at least one plate-shaped carbon member disposed between the plurality of carbon particles. The plurality of catalyst particles are supported on surfaces of the plurality of carbon particles.

A fuel cell catalyst layer according to a second aspect of the present disclosure includes a plurality of carbon particles, a plurality of catalyst particles, and at least one rod-shaped carbon member disposed between the plurality of carbon particles. The plurality of catalyst particles are supported on surfaces of the plurality of carbon particles. The fuel cell catalyst layer according to the second aspect of the present disclosure further has a first surface and a second surface disposed at a side opposite to the first surface, and has a first region exposed at the first surface and a second region located to be closer to the second surface than the first region is. An ionomer/carbon ratio in the first region is higher than an ionomer/carbon ratio in the second region.

A fuel cell according to a third aspect of the present disclosure includes an electrolyte film, an anode catalyst layer, an anode gas diffusion layer, a cathode catalyst layer, and a cathode gas diffusion layer. The anode catalyst layer is formed on a first main surface of the electrolyte film. The anode gas diffusion layer is formed on the anode catalyst layer at a side opposite to the electrolyte film. The cathode catalyst layer is formed on a second main surface of the electrolyte film, the second main surface being at a side opposite to the first main surface. The cathode gas diffusion layer is formed on the cathode catalyst layer at a side opposite to the electrolyte film. At least one of the anode catalyst layer and cathode catalyst layer is the fuel cell catalyst layer according to the first or the second aspect of the present disclosure.

The present disclosure enables a fuel cell catalyst layer to have an increased interstice ratio and thus enables improvements in gas diffusibility and highest power density. An increase in interstice ratio contributes to improved performance in drainage of water generated by reaction of protons and electrons. The present disclosure also improves a utilization rate of a high-priced catalyst metal such as platinum and thus allows a reduction in catalyst metal usage. As a result, costs required for a fuel cell catalyst layer and a fuel cell can be reduced.

DETAILED DESCRIPTION OF EMBODIMENT

Figure 8:
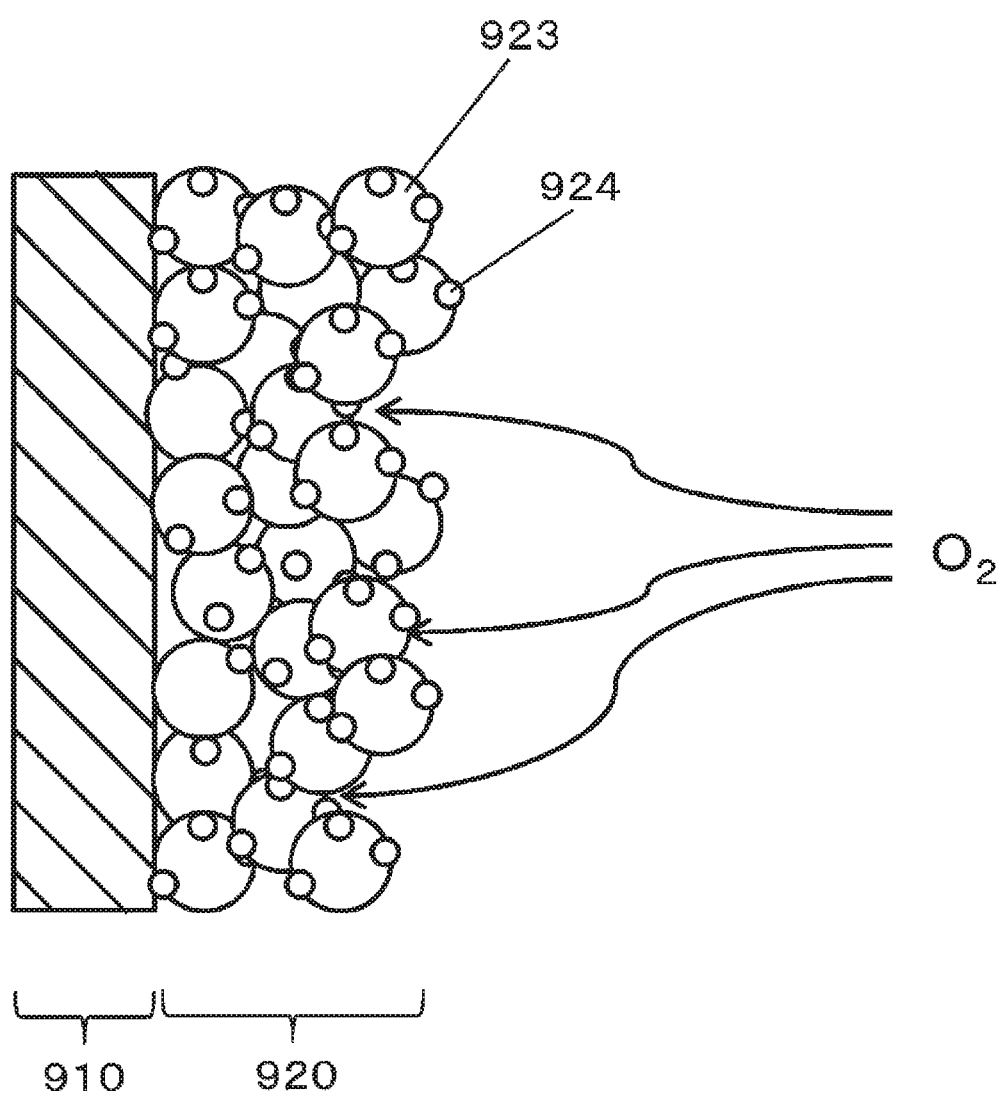
FIG. 8 is a schematic view illustrating a principal part of a conventional fuel cell.

With reference to FIG. 8, a problem with the conventional art will be briefly described prior to describing exemplary embodiments of the present disclosure. FIG. 8 schematically illustrates electrolyte film 910 and catalyst layer 920 of a conventional fuel cell. In a conventional structure of catalyst layer 920, spherical carbon members 923 support particles of platinum 924. The conventional structure does not allow satisfactory supply of air and hydrogen gas to platinum 924, which is located near electrolyte film 910, in catalyst layer 920. Thus, gas diffusion rate limiting occurs in conventional structure. This may be caused by the state that the structure of catalyst layer 920 is too dense, as shown in FIG. 8. A power generation efficiency can be improved if gas is supplied up to a surface of platinum 924 that is located near electrolyte film 910. Thus, the present disclosure provides a fuel cell catalyst layer and a fuel cell that achieve enhanced power generation efficiency through an improvement in a utilization rate of a metal catalyst such as platinum.

A fuel cell catalyst layer and a fuel cell according to exemplary embodiments of the present disclosure will be described below with reference to the accompanying drawings.

First Exemplary Embodiment

Figure 1:
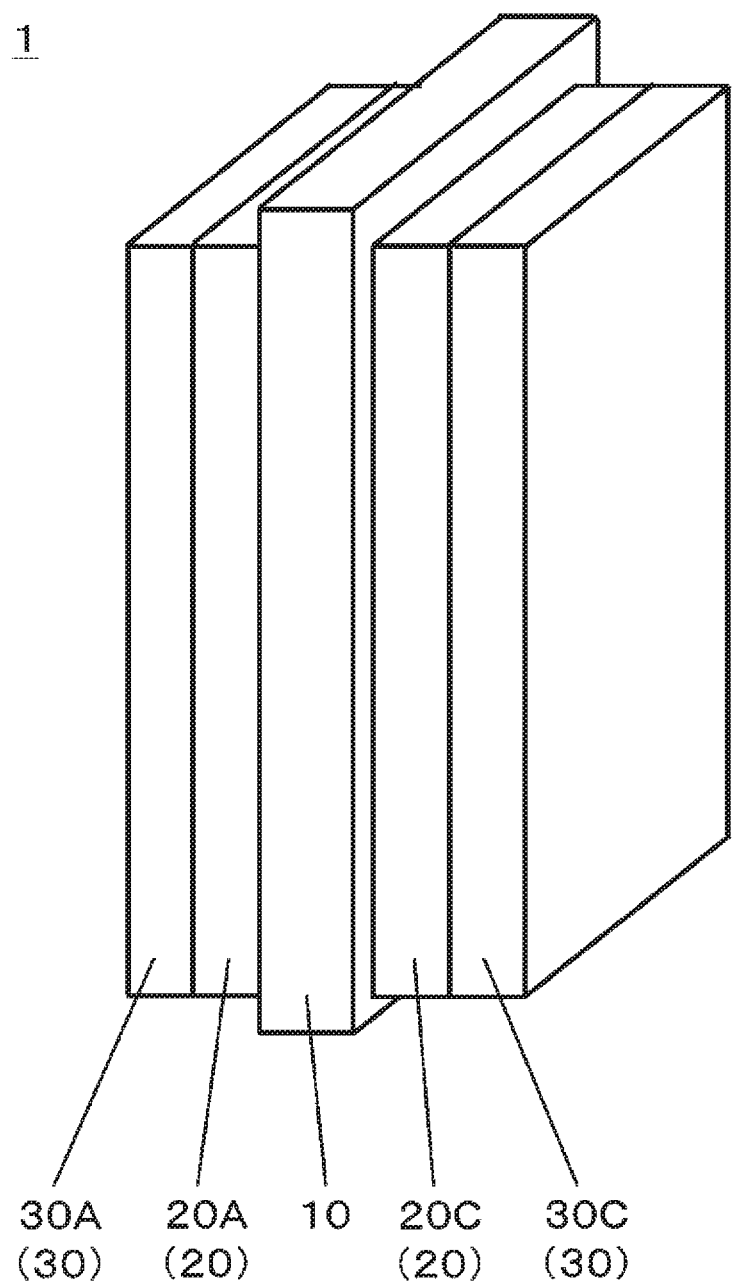
FIG. 1 is a perspective view illustrating a fuel cell according to an exemplary embodiment of the present disclosure.

With reference to FIG. 1, a first exemplary embodiment will be described below. FIG. 1 is a perspective view illustrating fuel cell 1 according to the present exemplary embodiment. Fuel cell 1 includes electrolyte film 10. Anode-side catalyst layer 20, namely, anode catalyst layer 20A is formed on one of main surfaces (a first main surface) of electrolyte film 10, and cathode-side catalyst layer 20, namely, cathode catalyst layer 20C is formed on the other main surface (a second main surface) of electrolyte film 10. Anode-side gas diffusion layer 30, namely, anode gas diffusion layer 30A is formed on anode catalyst layer 20A at a side opposite to electrolyte film 10, and cathode-side gas diffusion layer 30, namely, cathode gas diffusion layer 30C is formed on cathode catalyst layer 20C at a side opposite to electrolyte film 10.

Electrolyte film 10 has good ion conductivity in a wet state, and serves as an ion exchange membrane that allows protons to move between anode catalyst layer 20A and cathode catalyst layer 20C. Electrolyte film 10 is formed of a solid polymer material such as fluorine-containing polymer or non-fluorine polymer. Examples of the material of electrolyte film 10 include sulfonic acid type perfluorocarbon polymer, polysulfone resin, and perfluorocarbon polymer including phosphonate group or carboxylic acid group. Examples of sulfonic acid type perfluorocarbon polymer includes Nafion (manufactured by Du Pont; registered trademark). Examples of non-fluorine polymer include sulfonated aromatic polyether ether ketone and polysulfone. Electrolyte film 10 has a thickness of, for example, 3 μm to 100 μm, inclusive.

Figure 2:
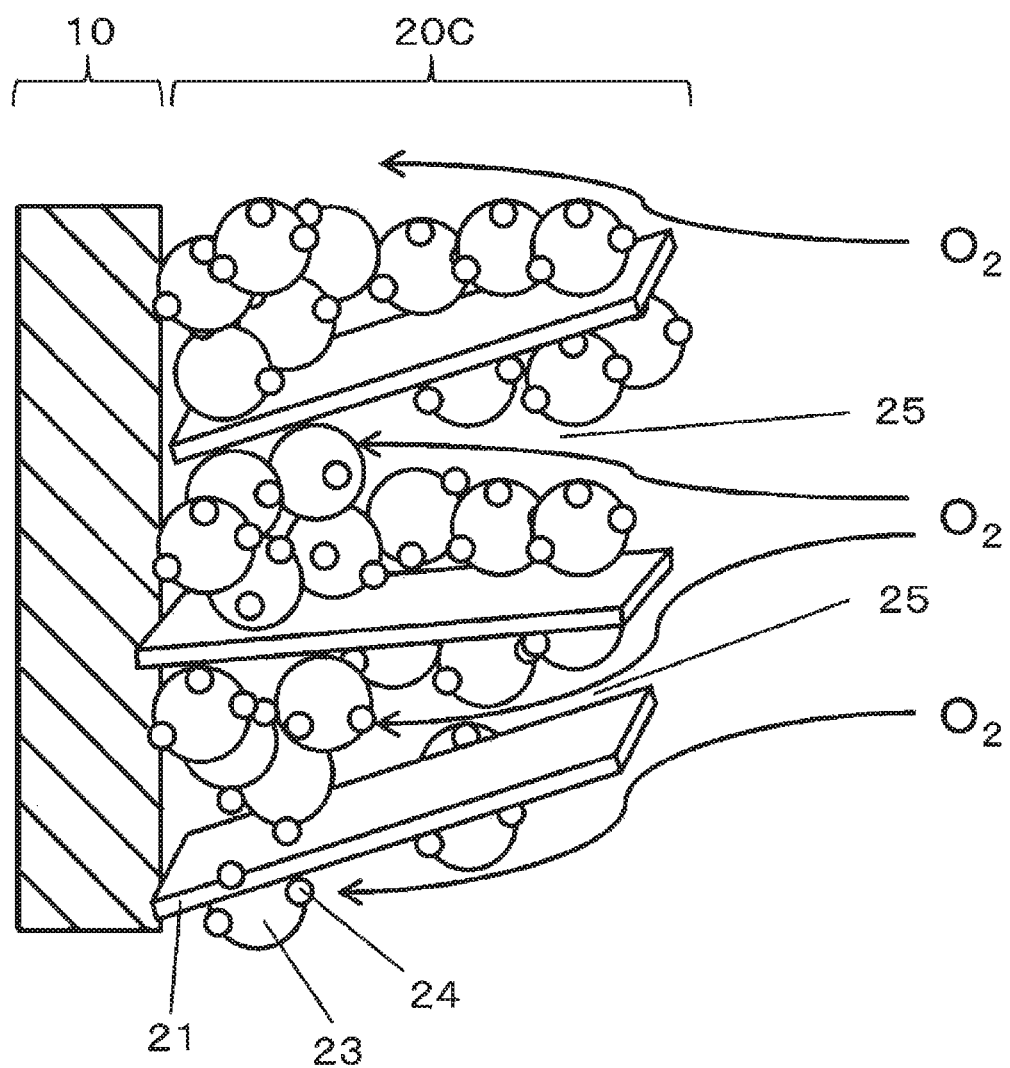
FIG. 2 is a schematic view illustrating a principal part of a fuel cell according to a first exemplary embodiment of the present disclosure.

FIG. 2 is a schematic view illustrating electrolyte film 10 and cathode catalyst layer 20C. Anode catalyst layer 20A and cathode catalyst layer 20C each include an ionomer (not illustrated) having proton conductivity, catalyst particles 24, and carbon particles 23 that support catalyst particles 24. Cathode catalyst layer 20C further includes a plate-shaped carbon members 21 formed from graphene. Plate-shaped carbon members 21 are disposed among the plurality of carbon particles 23. The ionomer included in anode catalyst layer 20A and cathode catalyst layer 20C connects catalyst particles 24 with electrolyte film 10 to transfer protons between catalyst particles 24 and electrolyte film 10. The ionomer may be formed of a polymer material similar to the polymer material of electrolyte film 10. Catalyst particles 24 are each formed from any alloy or single element selected from the group consisting of Sc, Y, Ti, Zr, V, Nb, Fe, Co, Ni, Ru, Rh, Pd, Pt, Os, Ir, lanthanoid series elements, and actinoid series elements, for example. Carbon particles 23 each may be, for example, carbon black, acetylene black, or Ketjenblack. Anode catalyst layer 20A and cathode catalyst layer 20C each measure, for example, 100 nm or greater and less than 50 μm in thickness. The graphene is an example material for plate-shaped carbon members 21.

Anode gas diffusion layer 30A and cathode gas diffusion layer 30C each have a thickness of, for example, 50 μm to 500 μm, inclusive.

In some cases, a stacked structure of anode catalyst layer 20A and anode gas diffusion layer 30A may be referred to as an anode, and a stacked structure of cathode catalyst layer 20C and cathode gas diffusion layer 30C may be referred to as a cathode.

A fuel cell catalyst layer (cathode catalyst layer 20C) according to the present exemplary embodiment includes plate-shaped carbon members 21. This configuration provides interstices 25 among some carbon particles 23 in cathode catalyst layer 20C. The plurality of plate-shaped carbon members 21 is irregularly interposed such that a ratio of interstices 25 formed in cathode catalyst layer 20C is high. In other words, catalyst layer 20 has a sparse structure that allows gas to be supplied up to surfaces of catalyst particles 24 located near electrolyte film 10. As a result, fuel cell 1 can have an improved power generation efficiency.

Figure 3:
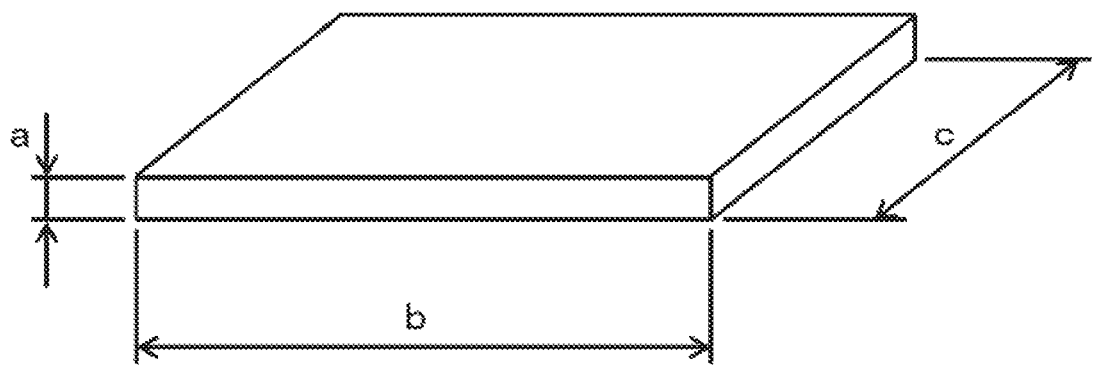
FIG. 3 is a perspective view illustrating a plate-shaped carbon member according to the first exemplary embodiment of the present disclosure.

With reference to FIG. 3, plate-shaped carbon members 21 each preferably, satisfy the relationships $10 \leq b/a \leq 40000$, $a<b$, and $a<c$, as well as $0.5 \text{ nm}<a<100 \text{ nm}$, $50 \text{ nm}<b<20 \text{ μm}$, and $50 \text{ nm}<c<20 \text{ μm}$ an where a thickness of plate-shaped carbon member 21 is denoted by a, a width of plate-shaped carbon member 21 is denoted by b, and a depth of plate-shaped carbon member 21 is denoted by c.

Since plate-shaped carbon members 21 are plate-shaped, the relationships $a<b$ and $a<c$ are satisfied. Basically, an increase in aspect ratio (b/a) of a plate-shaped carbon member brings greater effect. However, when the aspect ratio is too high, there may be a problem with a strength of plate-shaped carbon members 21. For instance, at the time of making ink that is used to form cathode catalyst layer 20C (the ink will be described in detail later along with a description of a "first process"), when carbon particles 23 for supporting catalyst particles 24 and an ionomer are dispersed into an organic solvent, plate-shaped carbon members 21 may be brought into contact with carbon particles 23 supporting catalyst particles 24 and thus may be crashed. Therefore, it is preferred that $b/a \leq 40000$ be satisfied. Meanwhile, when an aspect ratio (b/a) is too low, the strength of plate-shaped carbon members 21 increases. Thus, a structure formed by carbon particles 23 supporting catalyst particles 24 may be destroyed, and an electron conductivity declines due to the destruction of the structure. Further, interstices 25 may get difficult to be formed. Thus, $10 \leq b/a$ is preferably satisfied.

When $0.5 \text{ nm}<a<100 \text{ nm}$ is satisfied, each of plate-shaped carbon members 21 can be readily interposed between carbon particles 23 that support catalyst particles 24. When $50 \text{ nm}<b<20 \text{ μm}$, and $50 \text{ nm}<c<20 \text{ μm}$ are satisfied, a proportion of interstices 25 in catalyst layer 20 may be high. Thus, a possibility of interrupting passage of air and other gases through cathode catalyst layer 20C can be reduced.

Preferably, plate-shaped carbon members 21 are constituted by a first group of plate-shaped carbon members and a second group of plate-shaped carbon members. When an average (a first average) of larger one of width b and depth c (the length of a long side) of every plate-shaped carbon member in the first group is referred to, for example, x, an average (a second average) of larger one of width b and depth c (the length of a long side) of every plate-shaped carbon member in the second group is preferably one hundredth of the first average or greater (namely, x/100 or greater) and one half of the first average or smaller (namely, x/2 or smaller). In other words, preferably, catalyst layer 20 includes the first and second groups of plate-shaped carbon members, and the average of the length of a long side of every plate-shaped carbon member in the second group is ranging from one hundredth of the average of the length of a long side of every plate-shaped carbon member in the first group to one half of the average of the length of a long side of every plate-shaped carbon member in the first group, inclusive. Following effects can be obtained by including the first and second groups of plate-shaped carbon members in catalyst layer 20. The first group of plate-shaped carbon members contributes to increasing interstices 25. And the second group of plate-shaped carbon members forms a structure that links carbon particles 23 supporting catalyst particles 24 together so as to help secure a plurality of electron transport paths and improve conductivity of catalyst layer 20.

A content ratio of the first group of plate-shaped carbon members to the second group of plate-shaped carbon members is not particularly limited so long as the content ratio allows exertion of the effects described above.

Thickness a, width b, and depth c, which are required to calculate the aspect ratio of plate-shaped carbon member 21, are measured as follows. Specifically, cathode catalyst layer 20C is cut to form a cross-section. An image of the cross-section is captured by a scanning electron microscope (SEM) after the cross-section has been polished. Thickness a, width b, and depth c of plate-shaped carbon member 21 are measured based on the obtained cross-sectional image. Alternatively, measurement may be performed by using a transmission electron microscope (TEM).

Another measuring method may be performed as follows. That is, a part of cathode catalyst layer 20C is cut out and put into a solvent that dissolves an ionomer. This process dissolves the ionomer contained in cathode catalyst layer 20C. Then, plate-shaped carbon members 21 are separated and recovered from the solvent through the well-known operation such as filtration. For example, 400 separated plate-shaped carbon members 21 are randomly extracted, and thickness a, width b, and depth c of each plate-shaped carbon member 21 are measured by using a SEM. Plate-shaped carbon members 21 may be separated by a method without using a solvent that dissolves an ionomer. In this method, the cut-out part of cathode catalyst layer 20C is heated, for example, in an atmosphere of an inert gas such as nitrogen at a temperature of 500° C. for 30 minutes. This process burns the ionomer off to separate plate-shaped carbon members 21.

In solid polymer fuel cell 1 described above, a reaction described below occurs. That is, when hydrogen gas as fuel gas is supplied to anode catalyst layer 20A through anode gas diffusion layer 30A, a reaction represented by Expression (1) below occurs in anode catalyst layer 20A, and thus hydrogen is decomposed into protons and electrons. The protons move in electrolyte film 10 toward cathode catalyst layer 20C. The electrons move to an external circuit (not illustrated) through anode gas diffusion layer 30A, and then flow from the external circuit into cathode catalyst layer 20C through cathode gas diffusion layer 30C. When air as oxidant gas is supplied to cathode catalyst layer 20C through cathode gas diffusion layer 30C, a reaction represented by Expression (2) below occurs in cathode catalyst layer 20C, and oxygen in the air becomes water through reaction with protons and electrons. As a result, electrons flow from the anode toward the cathode through the external circuit, thereby generating electrical power.

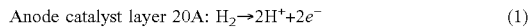
Anode catalyst layer 20A: $H_2 \rightarrow 2H^+ + 2e^-$ (1)

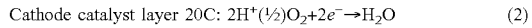
Cathode catalyst layer 20C: $2H^+ + (\frac{1}{2})O_2 + 2e^- \rightarrow H_2O$ (2)

(Manufacturing Method)

One example of a method for manufacturing a fuel cell according to the first exemplary embodiment will be described below.

This manufacturing method includes making ink (a first process), forming a catalyst layer (a second process), and hot pressing (a third process).

(First Process)

In the first process, ink is made. Catalyst particles 24 formed from a catalyst metal are prepared in advance. The catalyst metal is any alloy or single element selected from the group consisting of Sc, Y, Ti, Zr, V, Nb, Fe, Co, Ni, Ru, Rh, Pd, Pt, Os, Ir, lanthanoid series elements, and actinoid series elements. Carbon particles 23 that are, for example, carbon black, acetylene black, or Ketjenblack, are prepared. Catalyst particles 24 are supported on carbon particles 23. An ionomer for conducting protons is also prepared.

Carbon particles 23 supporting catalyst particles 24 and the ionomer are dispersed in an organic solvent such as ethanol, so that ink is made. Plate-shaped carbon members 21 formed from graphene or similar material are added only to ink for cathode catalyst layer formation, whereas no plate-shaped carbon member is added to ink for anode catalyst layer formation.

(Second Process)

In the second process, catalyst layer 20 is formed on electrolyte film 10. The ink for cathode catalyst layer formation is applied to a cathode-side main surface of electrolyte film 10, and then the ink for anode catalyst layer formation is applied to an anode-side main surface of electrolyte film 10. Electrolyte film 10 coated with the ink is temporarily dried by letting the film stand in an atmosphere of a predetermined temperature for a predetermined length of time.

(Third Process)

In the third process, electrolyte film 10, catalyst layer 20, and gas diffusion layer 30 are integrated with one another.

First, gas diffusion layer 30 is prepared. Gas diffusion layer 30 is porous and contains a binder resin and a carbon member.

Next, gas diffusion layer 30 (anode gas diffusion layer 30A) is disposed on anode catalyst layer 20A at a side opposite to electrolyte film 10, and gas diffusion layer 30 (cathode gas diffusion layer 30C) is disposed on cathode catalyst layer 20C at a side opposite to electrolyte film 10. After that, electrolyte film 10, catalyst layer 20, and gas diffusion layer 30 are integrated with one another by hot pressing.

By the above manufacturing method, a fuel cell according to the present exemplary embodiment is completed.

Example

Fuel cell samples 1 to 4 were made by using the manufacturing method described above. Graphene was used for plate-shaped carbon members 21. Each of carbon members 21 made from graphene has thickness a ranging from 6 nm to 8 nm, inclusive, width b ranging from 1 μm to 2 μm, inclusive, and depth c ranging from 1 μm to 2 μm, inclusive. Carbon black supporting platinum as a catalyst metal is used as carbon particles 23 supporting catalyst particles 24.

The graphene was added to ink for the cathode catalyst layer such that a content proportion of the graphene was 20 percent by weight (wt %) relative to the carbon black supporting platinum. An amount of platinum supported on the carbon black was calculated by using cyclic voltammetry (CV). A thickness of the catalyst layer was measured through observation of a cross-section with a microscope or by using a micrometer. No graphene was added to ink for the anode catalyst layer. CV is a technique for electrochemical measurement of electrode surface changes through measurement of a current responding to swept electrode potential.

Contents of platinum contained in the respective samples, as well as addition or no addition of the graphene to ink for the cathode catalyst layer of each sample are shown below.

Figure 4:
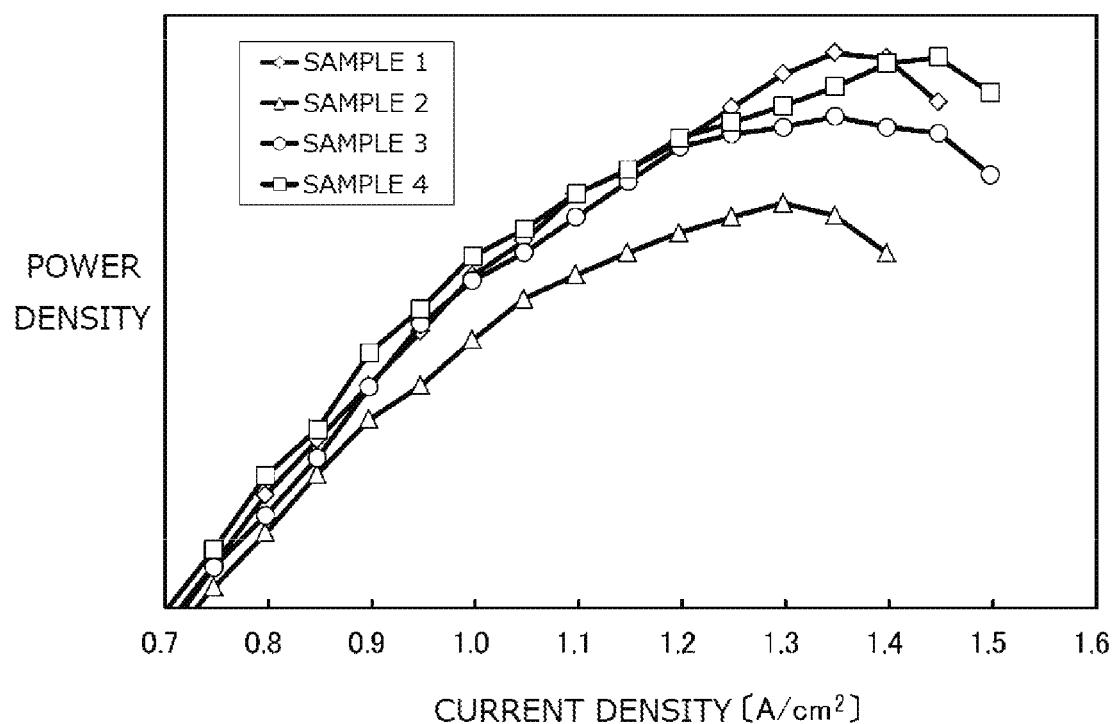
FIG. 4 is a graph showing current density-power density curves (I-P curves) of made samples.

Sample 1: Platinum content=0.3 mg/cm$^2$, graphene added
Sample 2: Platinum content=0.6 mg/cm$^2$, graphene added
Sample 3: Platinum content=0.3 mg/cm$^2$, no graphene added
Sample 4: Platinum content=0.6 mg/cm$^2$, no graphene added FIG. 4 is a graph showing current density-power density curves (I-P curves) of the respective samples. The graph shows current density at horizontal axis and power density (relative value) at vertical axis. Properties of the samples will be described below in terms of highest power density levels of the samples plotted on the respective I-P curves.

With reference to FIG. 4, a comparison between samples 3 and 4, each of which is added with no graphene, reveals that the highest power density of sample 4 is greater than the highest power density of sample 3. Specifically, the double in platinum content contributed to an increase of about 4% in the highest power density.

A comparison between samples 1 and 3, each of which has a platinum content of 0.3 mg/cm$^2$, reveals that the highest power density of sample 1 is greater than the highest power density of sample 3. Specifically, addition of the graphene increased the highest power density by about 4%.

A comparison of sample 1, which has a platinum content of 0.3 mg/cm$^2$ and the graphene, with sample 4, which has a platinum content of 0.6 mg/cm$^2$ and no graphene, reveals that the highest power density of sample 1 is about equal to the highest power density of sample 4.

That is, when the relatively low-priced graphene is added to sample 1 without increasing the high-priced platinum content from 0.3 mg/cm$^2$ to 0.6 mg/cm$^2$, the highest power density can be raised to a level equivalent to a level when a platinum content is increased to 0.6 mg/cm$^2$. In other words, according to the exemplary embodiment of the present disclosure, addition of graphene as plate-shaped carbon members 21 to cathode catalyst layer 20C allows a reduction in platinum usage.

A comparison between samples 2 and 4, each of which has a platinum content of 0.6 mg/cm$^2$, reveals that the highest power density of sample 2 is roughly 10% lower than the highest power density of sample 4. That is, addition of the graphene produced a contrary effect that the highest power density is decreased. A reason for the decrease is described below. Since a thick coat of ink was applied to the cathode catalyst layers of samples 2 and 4 due to an increased platinum content, cathode catalyst layers 20C were thick. Sample 2 was thicker than the other sample owning to use of ink with the additional graphene. This probably interrupted air supplied to cathode catalyst layer 20C through cathode gas diffusion layer 30C from entering a cathode catalyst layer 20C region near electrolyte film 10 and thus the highest power density was estimated to be decreased.

Thicknesses of cathode catalyst layers 20C were measured. Sample 2 had a thickness of 50 μm, whereas sample 1 had a thickness of 25 μm. Thus, in order to avoid the disadvantage described above, the thickness of cathode catalyst layer 20C is preferably less than 50 μm and more preferably 25 μm or less. In consideration of a smallest allowable thickness of cathode catalyst layer 20C applied in the second process, the thickness of cathode catalyst layer 20C is preferably 100 nm or more.

In this exemplary embodiment, plate-shaped carbon members are made from graphene, and consequently have the following effects. That is, graphene members are likely to be laminated by weak van der Waals forces. Thus, for example, even if graphene members are close to one another in a catalyst layer, a certain distance can be kept between the neighboring graphene members. Since space between the neighboring graphene members can be used as an interstice, this graphene member provides higher gas diffusibility than gas diffusibility of other ordinary plate-shaped carbon members. Moreover, graphene is very thin because of its sheet shape. Thus, addition of graphene to cathode catalyst layer 20C does not make cathode catalyst layer 20C excessively thick. A possibility of interrupting air from entering the cathode catalyst layer 20C region near electrolyte film 10 can be reduced and a decrease in highest power density can be suppressed. Furthermore, graphene has very small resistance compared with other carbon members, and enables efficient transport of electrons in cathode catalyst layer 20C.

In this exemplary embodiment, only cathode catalyst layer 20C includes graphene, and anode catalyst layer 20A does not include graphene. Thus, this configuration prevents anode catalyst layer 20A from increasing in both thickness and resistance. This configuration also prevents electrolyte film 10 from getting dry because anode catalyst layer 20A is more liable to get dry with an increase in thickness.

Figure 5:
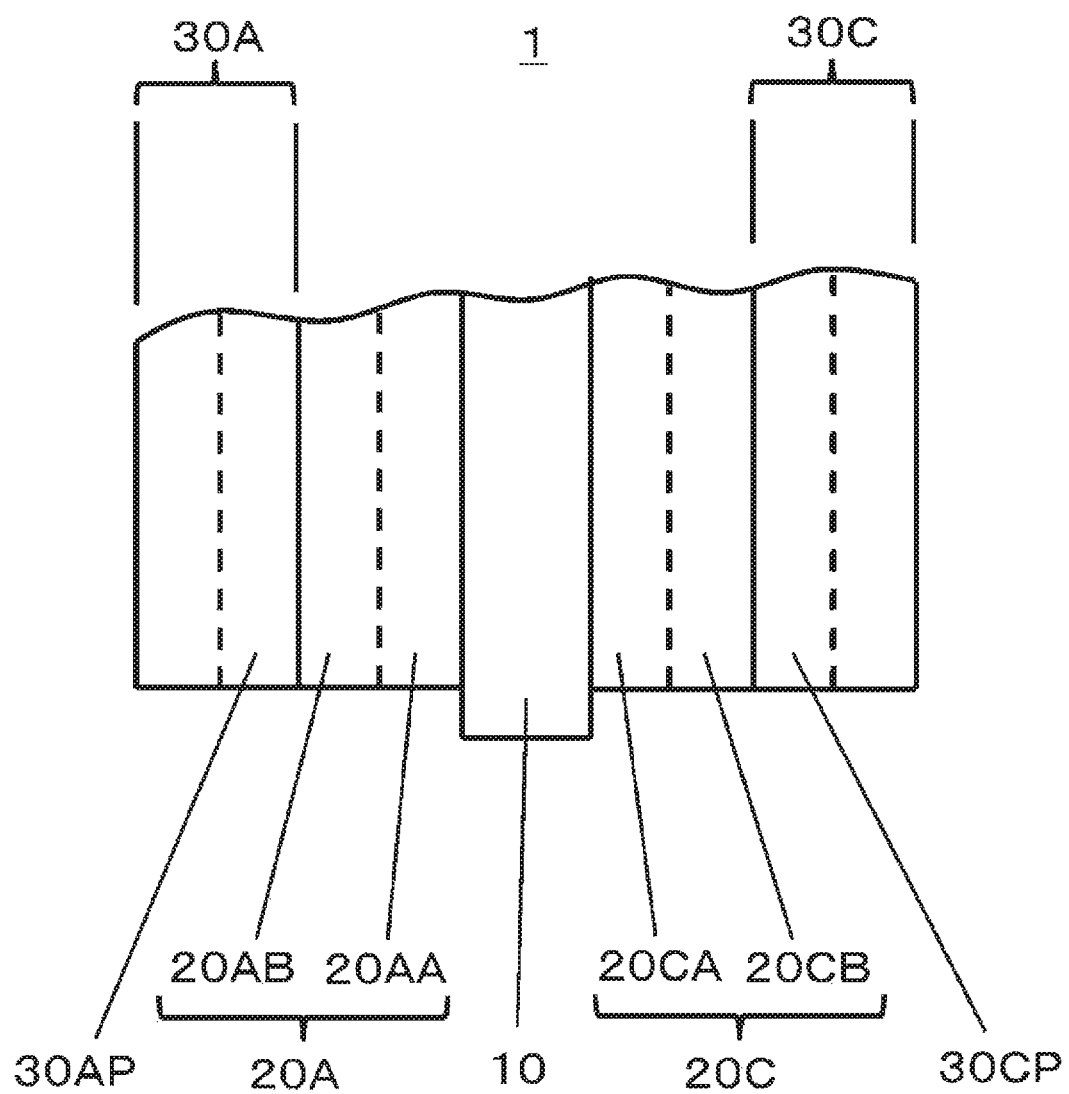
FIG. 5 is a partial front view illustrating the fuel cell illustrated in FIG. 1.

FIG. 5 is a partial front view illustrating a fuel cell according to this exemplary embodiment. Cathode catalyst layer 20C includes cathode catalyst layer inner region 20CA (a first region) as a region facing electrolyte film 10, and cathode catalyst layer outer region 20CB (a second region) as a region located to be closer to cathode gas diffusion layer 30C than cathode catalyst layer inner region 20CA is. That is, cathode catalyst layer 20C has a first surface facing electrolyte film 10 and a second surface at a side opposite to the first surface. Cathode catalyst layer inner region 20CA is exposed at the first surface, and cathode catalyst layer outer region 20CB is located to be closer to the second surface than cathode catalyst layer inner region 20CA is. Similarly, anode catalyst layer 20A includes anode catalyst layer inner region 20AA (a first region) as a region facing electrolyte film 10, and anode catalyst layer outer region 20AB (a second region) as a region located to be closer to anode gas diffusion layer 30A than anode catalyst layer inner region 20AA is.

In FIG. 5, dashed lines are added for convenience in indicating a boundary between cathode catalyst layer inner region 20CA and cathode catalyst layer outer region 20CB, as well as a boundary between anode catalyst layer inner region 20AA and anode catalyst layer outer region 20AB.

An ionomer/carbon (I/C) ratio that is a ratio of ionomer to carbon may be made to be higher in cathode catalyst layer inner region 20CA than in cathode catalyst layer outer region 20CB. This configuration improves transport of protons from electrolyte film 10. Compared with a configuration having a uniform ionomer/carbon ratio, this configuration reduces the diffusibility of oxygen gas because of an increase in a content of the ionomer in cathode catalyst layer inner region 20CA, but plate-shaped carbon members incorporated in the layer contribute to compensating for the reduced diffusibility of oxygen gas. As a result, this configuration comprehensively improves performance of cathode catalyst layer 20C.

With reference to FIG. 5, cathode gas diffusion layer 30C includes cathode (micro-)porous layer (MPL) 30CP as a water-repellent layer formed in a region facing cathode catalyst layer 20C, whereas anode gas diffusion layer 30A includes anode porous layer 30AP as a water-repellent layer formed in a region facing anode catalyst layer 20A.

Similarly to cathode catalyst layer 20C, cathode porous layer 30CP may include plate-shaped carbon members 21. This configuration can improve the diffusibility of oxygen gas in cathode gas diffusion layer 30C and can reduce contact resistance between cathode porous layer 30CP and cathode catalyst layer 20C.

Second Exemplary Embodiment

In the first exemplary embodiment, plate-shaped carbon members 21 (graphene or the like) are added to cathode catalyst layer 20C. A difference in a second exemplary embodiment from the first exemplary embodiment is that rod-shaped carbon member 22 in place of plate-shaped carbon member 21 is added to a catalyst layer. The following description is mainly given on different points between the first and second exemplary embodiments, and redundant descriptions on shared matters are omitted or simplified. Members or portions identical to those of the first exemplary embodiment are assigned with the same reference numerals.

Figure 6:
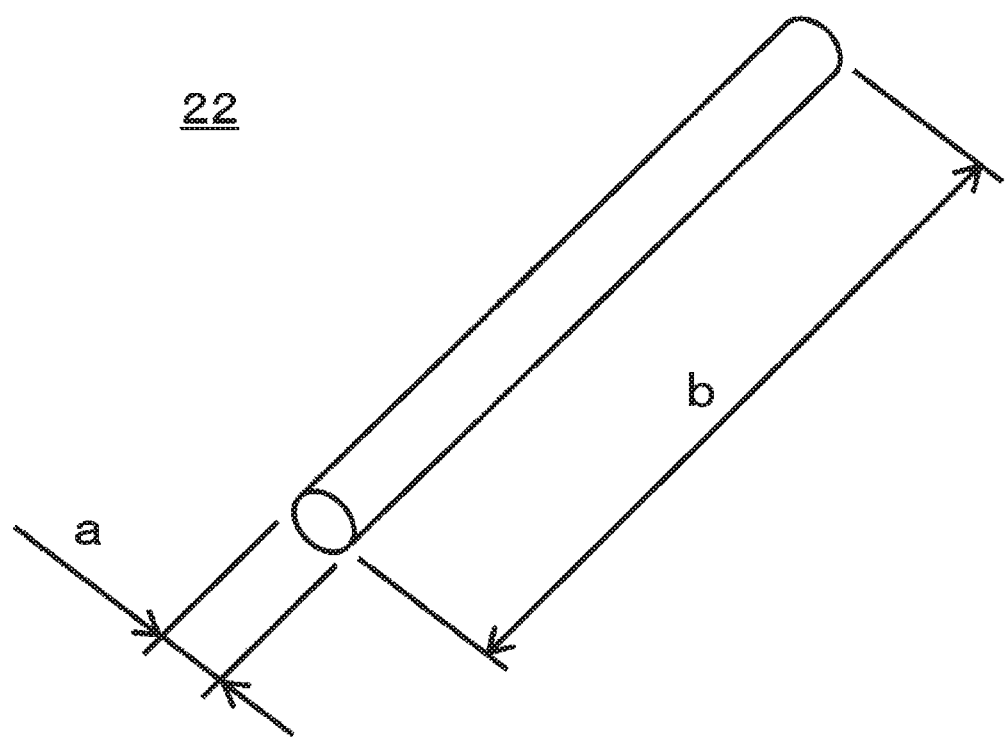
FIG. 6 is a perspective view illustrating a rod-shaped carbon member according to a second exemplary embodiment of the present disclosure.
Figure 7:
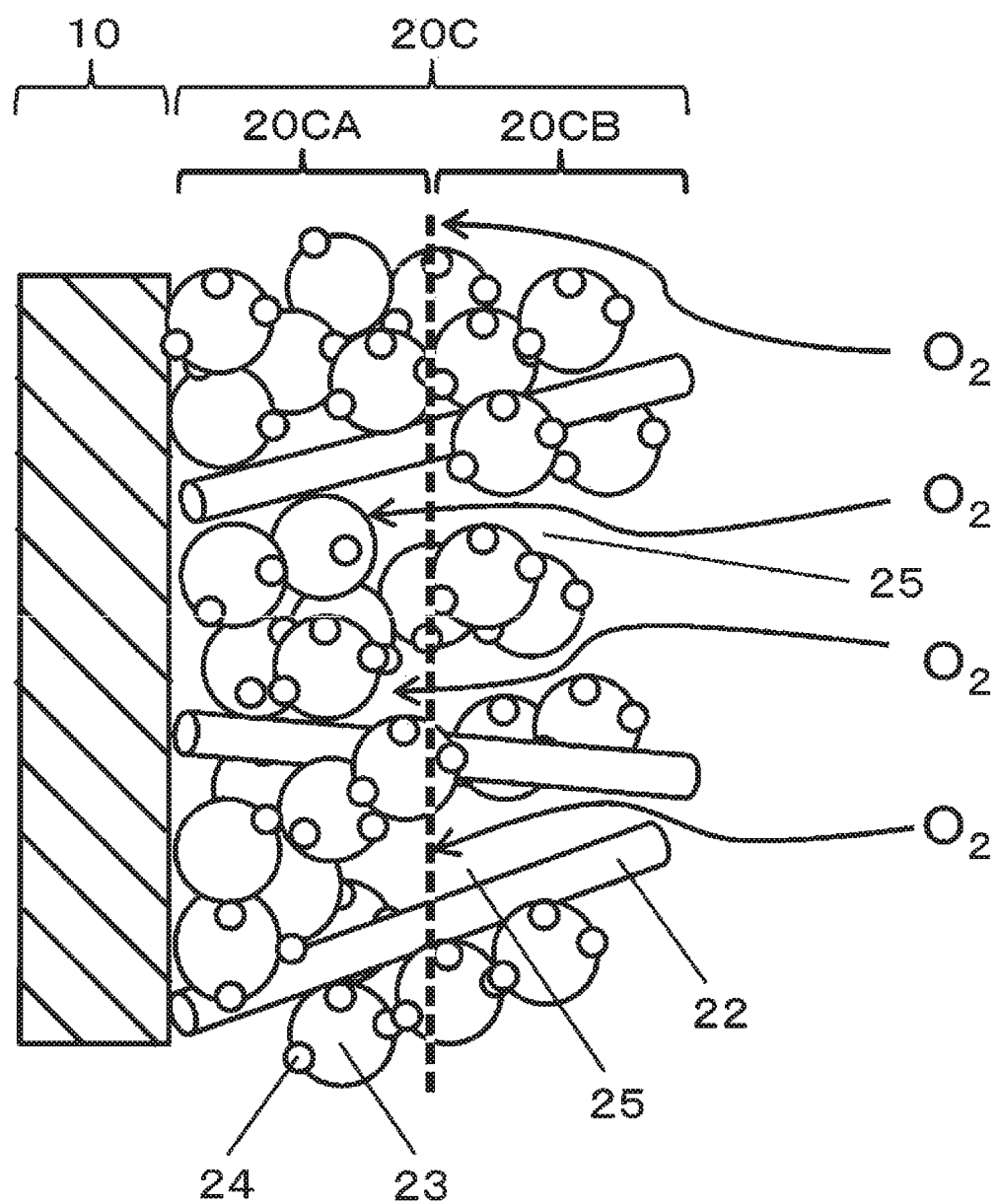
FIG. 7 is a schematic view illustrating a principal part of a fuel cell according to the second exemplary embodiment of the present disclosure.

With reference to FIGS. 6 and 7, the present exemplary embodiment will be described. Cathode catalyst layer 20C according to this exemplary embodiment includes rod-shaped carbon members 22, and carbon particles 23 supporting catalyst particles 24 on their surfaces. With reference to FIG. 7, a plurality of rod-shaped carbon members 22 are irregularly interposed such that a proportion of interstices 25 formed in cathode catalyst layer 20C is high. That is, cathode catalyst layer 20C has a sparse structure that allows gas to be supplied up to surfaces of catalyst particles 24 located near electrolyte film 10. As a result, fuel cell 1 can have an improved power generation efficiency.

The fuel cell catalyst layer of the second exemplary embodiment, however, has a lower proportion of interstices 25 than the fuel cell catalyst layer of the first exemplary embodiment has. This is because each rod-shaped carbon member 22 has a smaller volume than each plate-shaped carbon member 21 has. Thus, a fuel cell catalyst layer of the first exemplary embodiment is more preferable than a fuel cell catalyst layer of the second exemplary embodiment in terms of the effect of improving power generation efficiency of fuel cell 1 by supplying gas up to the surfaces of catalyst particles 24 located near electrolyte film 10.

In the present exemplary embodiment as with the first exemplary embodiment, an ionomer/carbon ratio may be made to be higher in cathode catalyst layer inner region 20CA than in cathode catalyst layer outer region 20CB. This configuration can produce an effect similar to that described in the first exemplary embodiment.

Similarly to cathode catalyst layer 20C, cathode porous layer 30CP may include rod-shaped carbon members 22. This configuration can improve the diffusibility of oxygen gas in cathode gas diffusion layer 30C and can reduce contact resistance between cathode porous layer 30CP and cathode catalyst layer 20C.

Rod-shaped carbon members 22 may be, for example, carbon fibers such as carbon nano tubes, polyacrylonitrile carbon fibers, rayon carbon fibers, or pitch carbon fibers, metal fibers, or metal-carbon composite materials such as carbon-coated metal fibers. With reference to FIG. 6, each of rod-shaped carbon members 22 preferably satisfies the relationships $10 \leq b/a \leq 40000$ and $a<b$ where a diameter of each of rod-shaped carbon members 22 is denoted by a and a length of each of rod-shaped carbon members 22 is denoted by b. Further, each of rod-shaped carbon members 22 preferably satisfies relationships $0.5 \text{ nm} < a < 100 \text{ nm}$ and $50 \text{ nm} < b < 20 \text{ μm}$.

Since each of rod-shaped carbon members 22 is shaped like a rod, the relationship $a<b$ is satisfied. Basically, an increase in aspect ratio (b/a) of a plate-shaped carbon member brings greater effect. However, when the aspect ratio is too high, there may be a problem with a strength of rod-shaped carbon members 22. For instance, at the time of making ink that is used to form cathode catalyst layer 20C, when carbon particles 23 supporting catalyst particles 24 and an ionomer are dispersed into an organic solvent, rod-shaped carbon members 22 may be brought into contact with carbon particle 23 supporting catalyst particles 24, and thus may be crushed. Therefore, it is preferred that $b/a \leq 40000$ be satisfied. Meanwhile, when an aspect ratio (b/a) is too low, the strength of rod-shaped carbon members 22 is increased. Thus, a structure formed by carbon particle 23 supporting catalyst particles 24 may be destroyed, and an electron conductivity declines due to the destruction in the structure. Further, interstices 25 may get difficult to be formed. Thus, $10 \leq b/a$ is preferably satisfied.

When $0.5 \text{ nm} < a < 100 \text{ μm}$, and $50 \text{ nm} < b < 20 \text{ μm}$ are satisfied, a proportion of interstices 25 in cathode catalyst layer 20C may be high. Thus, a possibility of interrupting passage of air and other gases through cathode catalyst layer 20C can be reduced.

A procedure for measuring thickness a, width b, and depth c, which are required to calculate the aspect ratio of plate-shaped carbon members 21, is described in the first exemplary embodiment. This procedure can be used also to measure diameter a and length b, which are required to calculate the aspect ratio of rod-shaped carbon members 22.

The preferable thickness range applied to cathode catalyst layer 20C for plate-shaped carbon members 21 in the first exemplary embodiment can also be applied to cathode catalyst layer 20C for rod-shaped carbon members 22.

In the second exemplary embodiment, rod-shaped carbon members 22 are carbon nanotubes and consequently have the following effects. That is, since each of the carbon nanotubes has a tubular hollow structure, the hollow acts as a bypass and helps air, hydrogen gas and other gases to diffuse (improved gas diffusibility). Oxygen in the air reacts with protons and electrons to form water and the formed water can get out via the hollow (improved drainage performance). The hollow in the carbon nanotube also acts as an interstice and thus this carbon member provides higher gas diffusibility than other ordinary rod-shaped carbon members provide.

Differently from the art of Unexamined Japanese Patent Publication No. 2009-224181, the configuration in the second exemplary embodiment includes carbon particles 23 supporting catalyst particles 24, and rod-shaped carbon members 22. Thus, a number of electron transport paths in cathode catalyst layer 20C increases. As a result, this configuration achieves lower resistance than a configuration simply having rod-shaped carbon members 22.

Characteristics common to the first and second exemplary embodiments are described below.

Preferably, a gross weight of carbon particles 23 is greater than a gross weight of plate-shaped carbon members 21 in cathode catalyst layer 20C. When plate-shaped carbon members 21 are excessively added to cathode catalyst layer 20C, cathode catalyst layer 20C has a thickness that is thicker than necessary. In this case, an effect of increased interstices caused by addition of plate-shaped carbon members 21 is impaired by a harmful effect of increased distance for gas to travel from one main surface of cathode catalyst layer 20C (a surface facing cathode gas diffusion layer 30C) to the other main surface of cathode catalyst layer 20C (a surface facing electrolyte film 10). This lowers gas diffusibility.

Highest power density of cathode catalyst layer 20C with a platinum content of 0.3 mg/cm$^2$ was measured by varying the ratio of the gross weight of plate-shaped carbon members 21 to the gross weight of carbon particles 23, namely, a ratio of an amount of added plate-shaped carbon members 21. The highest power density in cathode catalyst layer 20C with the ratio of an amount of added plate-shaped carbon members 21 set to 1 percent by weight (wt %) was increased by 5 mW/cm$^2$ relative to the highest power density of cathode catalyst layer 20C without plate-shaped carbon member 21. The highest power density in cathode catalyst layer 20C with the ratio of the amount of added plate-shaped carbon members 21 set to 5 wt % was increased by 10 mW/cm$^2$. The highest power density in cathode catalyst layer 20C with the ratio of added plate-shaped carbon member 21 amount set to 20 wt % was increased by 30 mW/cm$^2$. The highest power density in cathode catalyst layer 20C with the ratio of the amount of added plate-shaped carbon members 21 set to 40 wt % was increased by 5 mW/cm$^2$. Thus, the ratio of the gross weight of plate-shaped carbon members 21 to the gross weight of carbon particles 23 is preferably fall within a range from 1% to 40%, inclusive, and more preferably from 5% to 20%, inclusive.

The catalyst layer with the ratio of the amount of added plate-shaped carbon members 21 set to 20 wt % showed the strongest effect. A catalyst layer with rod-shaped carbon members 22 added as well showed effect in similar ranges. However, the effect of rod-shaped carbon members 22 was weaker than that of plate-shaped carbon members 21. This is presumably because of the fact that plate-shaped carbon members 21 more readily form interstices.

Plate-shaped carbon members 21 lead to an increase in catalyst particle size, which is a cause of catalyst degradation, more readily than carbon particles 23 do. This is presumably because a catalyst readily moves on plate-shaped carbon member 21, whose surface small number of asperities. For this reason, catalyst supporting ratio A of carbon particles 23 is preferably greater than catalyst supporting ratio B of plate-shaped carbon members 21. Similarly, catalyst supporting ratio A of carbon particles 23 is preferably greater than catalyst supporting ratio C of rod-shaped carbon members 22 (catalyst supporting ratio A>catalyst supporting ratio B≈catalyst supporting ratio C). Catalyst supporting ratio A refers to a weight percentage of the plurality of catalyst particles supported on surfaces of the plurality of carbon particles to a total weight of the plurality of carbon particles and the plurality of catalyst particles supported on surfaces of the plurality of carbon particles. Catalyst supporting ratio B refers to a weight percentage of a plurality of catalyst particles supported on surfaces of the plurality of plate-shaped carbon members to a total weight of a plurality of plate-shaped carbon members and the plurality of catalyst particles supported on surfaces of the plurality of plate-shaped carbon members. Catalyst supporting ratio C refers to a weight percentage of a plurality of catalyst particles supported on surfaces of the plurality of rod-shaped carbon members to a total weight of a plurality of rod-shaped carbon members and the plurality of catalyst particles supported on surfaces of the plurality of rod-shaped carbon members.

The scope of the present disclosure is not be limited to the exemplary embodiments described above, and may include modifications and variations since those skilled in the art can add various design changes to the exemplary embodiments.

For instance, cathode catalyst layer 20C may include both plate-shaped carbon members 21 and rod-shaped carbon members 22 (a "modified exemplary embodiment"). A catalyst layer with additional carbon members having different shapes such as plate and rod shapes can be provided with interstices formed inside. In order of the first exemplary embodiment, the modified exemplary embodiment, and the second exemplary embodiment, the interstice proportion increases.

Addition of a plate- or rod-shaped carbon member to anode catalyst layer 20A can improve the gas diffusibility of anode catalyst layer 20A. Anode catalyst layer 20A and/or anode porous layer 30AP of anode gas diffusion layer 30A may have plate-shaped carbon member 21 or rod-shaped carbon member 22 to lower contact resistance between anode catalyst layer 20A and anode gas diffusion layer 30A. However, an effect in addition of a carbon member to cathode catalyst layer 20C is stronger than that in addition of a carbon member to anode catalyst layer 20A in terms of the diffusibility of hydrogen and oxygen gases.

Further, a configuration having plate-shaped carbon member 21 or rod-shaped carbon member 22 in anode catalyst layer 20A can produce the effect described earlier if an ionomer/carbon ratio in anode catalyst layer inner region 20AA is made to be higher than that in anode catalyst layer outer region 20AB.

When anode porous layer 30AP includes plate-shaped carbon member 21 in the first exemplary embodiment or when anode porous layer 30AP includes rod-shaped carbon member 22 in the second exemplary embodiment, the effect described earlier can be produced.

The first and second groups of plate-shaped carbon members may be contained in anode catalyst layer 20A rather than cathode catalyst layer 20C. Alternatively, the first and second groups of plate-shaped carbon members may be contained in both cathode and anode catalyst layers 20C and 20A.

A fuel cell catalyst layer and a fuel cell of the present disclosure can achieve improved highest power density and can be used in home and in-vehicle power sources.

What is claimed is:

1. A fuel cell including an electrolyte film, a catalyst layer disposed on a main surface of the electrolyte film, a gas diffusion layer disposed on the catalyst layer at a side opposite to the electrolyte film, the catalyst layer comprising:
   a plurality of carbon particles;
   a plurality of catalyst particles supported on surfaces of the plurality of carbon particles; and
   a plurality of plate-shaped carbon members disposed between the plurality of carbon particles, wherein:
   the plurality of plate-shaped carbon members are constituted by a first group of plate-shaped carbon members and a second group of plate-shaped carbon members,
   an average of a length of a long side of every plate-shaped carbon member in the second group is ranging from one hundredth of an average of a length of a long side of every plate-shaped carbon member in the first group to one half of the average of the length of a long side of every plate-shaped carbon member in the first group, and
   at least one of the plurality of carbon particles and at least one plate-shaped carbon member in the second group of plate-shaped carbon members are in direct contact with each other so that the at least one plate-shaped carbon member in the second group of plate-shaped carbon members and the at least one of the plurality of carbon particles constitute an electron transport path physically connecting between the electrolyte film and the gas diffusion layer.

2. A fuel cell including an electrolyte film, a catalyst layer disposed on a main surface of the electrolyte film, a gas diffusion layer disposed on the catalyst layer at a side opposite to the electrolyte film, the catalyst layer comprising:
   a plurality of carbon particles;
   a plurality of catalyst particles supported on surfaces of the plurality of carbon particles; and
   at least one plate-shaped carbon member disposed between the plurality of carbon particles, wherein:
   at least two of the plurality of carbon particles are in direct contact with each other so that the at least two of the plurality of carbon particles constitute an electron transport path physically connecting between the electrolyte film and the gas diffusion layer.

3. A fuel cell including an electrolyte film, a catalyst layer disposed on a main surface of the electrolyte film, a gas diffusion layer disposed on the catalyst layer at a side opposite to the electrolyte film, the catalyst layer comprising:
   a plurality of carbon particles;
   a plurality of catalyst particles supported on surfaces of the plurality of carbon particles; and
   a plate-shaped carbon member disposed between the plurality of carbon particles, wherein:
   both ends of the plate-shaped carbon member are in direct contact with the electrolyte film and the gas diffusion layer, respectively, so that the plate-shaped carbon member constitutes an electron transport path physically connecting between the electrolyte film and the gas diffusion layer.

4. The fuel cell according to claim 3, wherein
   at least two of the plurality of carbon particles are in direct contact with each other so that the at least two of the plurality of carbon particles constitute an electron transport path physically connecting between the electrolyte film and the gas diffusion layer.

* * * * *